United States Patent
Felger

[15] 3,671,626
[45] June 20, 1972

[54] INHIBITING DENTAL PLAQUE
[72] Inventor: Carl B. Felger, College Park, Md.
[73] Assignee: The Gillette Company, Boston, Mass.
[22] Filed: Dec. 14, 1970
[21] Appl. No.: 98,068

[52] U.S. Cl. ................................................424/49, 424/317
[51] Int. Cl. .............................................................A61r 7/16
[58] Field of Search .....................................424/49–58, 317

[56] References Cited

UNITED STATES PATENTS 3,542,917  11/1970  Schwartz et al..........................424/49

*Primary Examiner*—Richard L. Huff
*Attorney*—R. W. Furlong

[57] ABSTRACT

Inhibiting the formation of dental plaque with a composition comprising about 0.05 to 3 percent by weight of pyromellitic acid in a physiologically acceptable vehicle.

19 Claims, No Drawings

INHIBITING DENTAL PLAQUE

This invention relates to treating teeth to inhibit the formation of dental plaque.

Dental plaque consists of a dense strongly adherent organic layer that forms naturally on the teeth, the rate and extent of formation varying with the individual. The layer consists of proteinaceous and mucoid material derived not only from saliva and food but also from the residues of bacterial metabolism. Plaque is a haven for bacteria and is accordingly undesirable since it can be a contributing cause of caries. It also serves as a matrix for accelerating the formation of undesirable calculus deposits. If allowed to proliferate, the plaque layer can become very unsightly as well as detrimental to dental health. Heretofore, plaque has been controlled only by removing it mechanically, i.e., by frequent vigorous brushing with abrasive dentifrices and/or by professionally applied prophylaxis treatments. There is some evidence that strong bactericides frequently applied can slow down plaque formation, as might be expected, by reducing the population of plaque-forming bacteria. Applied with sufficient frequency at effective dosages, however, the biocidal activity of such compositions could have untoward effects.

Accordingly, an object of this invention is to provide compositions for inhibiting formation of dental plaque, which have little or no tendency to upset the normal balance of oral flora, so that mechanical removal is required only at long intervals. More specific objects are to provide plaque-inhibiting mouthwashes, dentifrices, toothpastes, tooth powders, and the like.

The invention features inhibiting the formation of dental plaque with compositions comprising about 0.05 to 3 percent by weight of pyromellitic acid in a physiologically acceptable liquid vehicle. One such composition, a dentifrice, contains an effective amount of an abrasive in addition to the acid. Another composition is in a liquid vehicle having a pH of about 3 to 9 (more preferably, about 5 to 7), which contains the equivalent of about 0.2 to 0.5 percent by weight of pyromellitic acid and a buffering anion. Another preferred composition is in a liquid vehicle and contains a germicide (preferably, 0.02 to 0.5 percent by weight) in addition to the acid.

The pyromellitic acid is conveniently provided in the form of a water soluble salt of the acid in an aqueous vehicle or in a mixture of water and one or more water-soluble alcohols, such as a mixture of water and ethyl alcohol, in which the alcohol content is up to about 25 percent (preferably between about 15 and 20 percent). The salt is conveniently provided in situ by adding pyromellitic acid to a medium containing the cation of a water-soluble salt of the acid.

Although, e.g., mouthwash or dentifrice compositions preferably contain buffering anions, dental plaque may be also removed in accordance with the invention by topically applying an unbuffered solution of pyromellitic acid by swabbing. In general, any buffer system may be used that buffers effectively in the pH range, 5 to 7, and is physiologically acceptable. Exemplary well-known buffer systems include phosphate, citrate, and phosphate-citrate mixtures, a preferred buffer being a conventional mixture of sodium or potassium phosphates.

The useful pyromellitic acid salts are those having a non-toxic inorganic or organic cation which produces a water-soluble salt (at least about 3 percent by weight at room temperature). Preferred cations include sodium, potassium, ammonium, alkylol ammonium, and quaternary ammonium ions. Since pyromellitic is a tetracarboxylic acid it can form mono-, di-, tri-, and tetrasalts with these cations, all of which can and do co-exist in solution, the ratio of these salts to each other depending on the pH and concentration of the solution and the identity of the cation, and not being otherwise critical to the present invention.

The composition may take any of a number of physical forms including mouthwashes, dentifrices (toothpaste, toothpowder, or toothcleaning liquid) or a liquid such as is used in the pressure-jet method for cleaning teeth (e.g., by a "Water Pic"). The composition may also be applied, as above noted, by swabbing onto the tooth surface without any substantial brushing or abrasive action. The dosage and duration of treatment is not critical and depends generally on the form of composition and the concentration of the pyromellitic acid salt. In addition to the pyromellitic acid salt, therefore, the composition may contain other ingredients to render it in a more desirable, or more applicable, or more convenient, or stabler physical form, so long as these ingredients are substantially inert to pyromellitic acid or otherwise not inhibitive of the protective action of the acid.

For example, minor amounts of other solvents (up to about 10 percent by weight) such as glycerol or a glycol may also be present in the water or aqueous alcohol vehicle. Flavoring agents and sweeteners such as peppermint oil, oil of cinnamon, saccharin, sorbitol, etc., may also be incorporated in suitable conventional amounts as may any of the conventional physiologically acceptable dyes or coloring agents. Suitable preservatives may also be included. Among the preferred preservatives are the phenolic type, examples being benzoic acid, the parasepts, hexylresorcinol, thymol, and chlorothymol. Other preferred preservatives are quaternary ammonium types, such as cetyl pyridinium chloride, benzylalkonium chloride, and dodecyl dimethyl (2-phenoxyethyl) ammonium bromide ("Domiphen bromide"). Should a germicidal formulation be desired, the concentration of the preservative ingredients can be increased from the preservative level to the oral germicidal level. For example, whereas 0.05 percent by weight or less of hexylresorcinol is useful as a preservative, 0.1 to 0.5 percent by weight is preferred for germicidal purposes. As another example, whereas 0.01 percent by weight or less of cetyl pyridinium chloride is useful as a preservative, 0.02 to 0.1 percent by weight is preferred for germicidal purposes.

Surfactants such as sodium lauryl sulfate, sodium lauryl sarcosinate or sodium lauryl sulfoacetate, preferably up to about 2 percent by weight, may also be incorporated, particularly in dentifrices. For toothpowder and toothpaste formulations, a suitable abrasive, such as calcium pyrophosphate, insoluble sodium metaphosphate, alumina, or calcium carbonate, is also present. The amount of abrasive may range, in a toothpaste from 30 to 60 percent by weight, and in a toothpowder from 50 to 98 percent by weight.

Other objects, features and advantages will be apparent to one skilled in the art from the following non-limiting examples.

EXAMPLE 1

A mouthwash was prepared by dissolving 5 grams of pyromellitic acid and 1 gram of benzoic acid in 1,000 grams of aqueous sodium phosphate buffer solution having a pH of 6.8. This mouthwash was tested clinically on a group of subjects who used it as their exclusive oral hygiene procedure over a period of 2 weeks. 10 ml was used to rinse the mouth twice per day, the duration of each rinsing being 1 minute. Both the test subjects and a control group, who rinsed with an identical composition minus the pyromellitic acid, were given an oral prophylaxis (brushing and scraping) to remove plaque immediately prior to the test. At the end of the test period the plaque which had accumulated on the teeth was measured quantitatively. It was found that the group which had used the pyromellitic acid-containing mouthwash had accumulated about 25 percent less plaque on the average than had the control group.

EXAMPLE 2

A mouthwash was prepared having the following composition in parts by weight:

| | |
|---|---|
| Pyromellitic acid | .5 parts |
| Hexylresorcinol | .1 parts |
| Ethanol | 20 parts |
| Sodium hydroxide sufficient | | to provide pH of 6.2 — 
Water to make up to 100 parts total

This mouthwash was also tested clinically and was found to be effective in inhibiting the build up of dental plaque.

EXAMPLE 3

A mouthwash was prepared having the following composition, in parts by weight:

| | |
|---|---|
| Pyromellitic acid | .5 parts |
| Ethanol | 20 parts |
| Sorbitol | 8.1 parts |
| Flavoring | .05 parts |
| Coloring | .004 parts |
| Sodium saccharin | .04 parts |
| Cetyl pyridinium chloride | .003 parts |
| Sodium hydroxide sufficient to provide pH of 6.4 | — |
| Water to make up to | 100 parts total |

This mouthwash also was tested clinically and found to be effective in inhibiting the build up to dental plaque.

EXAMPLE 4

A germicidal mouthwash for inhibiting dental plaque has the following composition, in parts by weight:

| | |
|---|---|
| Pyromellitic acid | 0.5 parts |
| Hexylresorcinol | .1 parts |
| Ethanol | 17.95 parts |
| Sorbitol | 4.5 parts |
| Sodium saccharin | .03 parts |
| Boric aicd | .134 parts |
| Peppermint oil | .038 parts |
| Menthol | .019 parts |
| Color | .004 parts |
| Sodium hydroxide sufficient to provide pH of 6.0 | — |
| Water to make up to | 100 parts total. |

EXAMPLE 5

A toothpaste for inhibiting dental plaque has the following composition in parts by weight:

| | |
|---|---|
| Calcium pyrophosphate | 20 parts |
| Calcium carbonate | 20 parts |
| Sodium lauryl sulfate | 1.5 parts |
| Glycerine | 10 parts |
| Sorbitol | 20 parts |
| Hydroxyethylcellulose | 1 part |
| Saccharin | .1 parts |
| Oil of peppermint | .8 parts |
| Pyromellitic acid | .8 parts |
| Sodium hydroxide sufficient to provide pH of 5.5 | — |
| Water to make up to | 100 parts total |

EXAMPLE 6

A toothpowder for inhibiting dental plaque has the following composition in parts by weight:

| | |
|---|---|
| Calcium pyrophosphate | 96.8 parts |
| Sodium lauryl sulfate | 1 part |
| Powdered disodium salt of pyromellitic acid | 1 part |
| Flavoring | 1 part |
| Sodium saccharin | .2 parts |

Other embodiments will occur to those skilled in the art and are within the following claims.

What is claimed is:

1. A dentifrice composition comprising about 0.05 to 3 percent by weight of (1) a member of the group consisting of pyromellitic acid and water-soluble salts thereof and (2) an effective amount of an abrasive in a physiologically acceptable vehicle.

2. The dentifrice composition of claim 1 wherein said vehicle includes a solvent for said member and has a pH between about 3 and 9.

3. The composition of claim 1 including about 0.2 to 0.5 percent by weight of said member.

4. The composition of claim 1 having a pH between about 5 and 7.

5. The composition of claim 1 including up to 2 percent by weight of a surfactant.

6. The composition of claim 1 wherein said member is in the form of a water-soluble salt of pyromellitic acid.

7. A composition for inhibiting the formation of dental plaque comprising about 0.05 to 3 percent by weight of (1) a member of the group consisting of pyromellitic acid and water-soluble salts thereof and (2) a buffering anion, said member dissolved in a physiologically acceptable liquid vehicle having a pH between about 3 and 9.

8. The composition of claim 7 wherein said vehicle comprises water and water-soluble alcohol.

9. The composition of claim 8 wherein said vehicle includes up to about 25 percent ethanol.

10. The composition of claim 9 wherein said vehicle includes about 15 to 20 percent ethanol.

11. The composition of claim 7 having a pH between about 5 and 7.

12. The composition of claim 7 wherein said vehicle includes an effective amount of a germicide selected from the class consisting of phenolic and quaternary ammonium type germicides.

13. The composition of claim 12 including about 0.02 to 0.5 percent of said germicide.

14. A composition for inhibiting the formation of dental plaque comprising about 0.05 to 3 percent by weight of (1) a member of the group consisting of pyromellitic acid and water-soluble salts thereof, and (2) an effective amount of a germicide, said member dissolved in a physiologically acceptable liquid vehicle having a pH between about 3 and 9.

15. The composition of claim 14 wherein said vehicle comprises water and water-soluble alcohol.

16. The composition of claim 15 wherein said vehicle includes up to about 25 percent ethanol.

17. The composition of claim 16 wherein said vehicle includes about 15 to 20 percent ethanol.

18. The composition of claim 14 having a pH between about 5 and 7.

19. A process for inhibiting the formation of dental plaque in teeth comprising applying to the teeth a composition comprising about 0.05 to 3 percent by weight of (1) a member of the group consisting of pyromellitic acid and water-soluble salts thereof and (2) a physiologically acceptable vehicle.

* * * * *